Fig. 1.

Sept. 10, 1957 R. H. HENSLEIGH ET AL 2,805,549
ROTARY, TURBINE TYPE HYDRAULIC TORQUE CONVERTER
Filed March 26, 1952 6 Sheets-Sheet 3

INVENTORS.
Robert H. Hensleigh,
James P. Waggener.
BY Harness, Dickey & Pierce
ATTORNEYS.

INVENTORS.
Robert H. Hensleigh,
James P. Waggener.
BY
Harness, Dickey & Pierce.
ATTORNEYS

United States Patent Office 2,805,549
Patented Sept. 10, 1957

2,805,549

ROTARY, TURBINE TYPE HYDRAULIC TORQUE CONVERTER

Robert H. Hensleigh, Birmingham, and James P. Waggener, Walled Lake, Mich.; said Waggener assignor to said Hensleigh Application March 26, 1952, Serial No. 278,666

1 Claim. (Cl. 60—54)

This invention relates to hydrokinetic power transmission devices such as fluid couplings or torque converters, and more particularly to transmissions having controls for varying the torque connection between the impeller portion and the turbine portion of the unit.

It is an object of the invention to provide an improved torque converter construction which is adapted for use with input shafts of constant or variable speed, with means for adjusting and maintaining the output shaft speed even though the horsepower requirements may be varied.

It is another object to provide an improved power transmission device having the above characteristics, which includes novel means for varying the impeller delivery rate to the turbine by means of adjustable pitch impeller blades. Associated with this object, it is contemplated to provide a torque converter having novel and improved pitch control actuating means which are easy to control and are positive in operation over a wide range.

It is a further object to provide a torque converter of the above nature having a novel and improved governor means adapted to maintain a constant output shaft speed by controlling the pitch control actuating means, and in which the governor has a high degree of sensitivity.

It is also an object to provide a torque converter having an improved governor of the above nature, the governor having an extraordinarily wide range of adjustability, so that the output shaft speed may be varied and controlled between very wide limits, and in which the sensitivity is maintained throughout the range.

It is another object to provide a torque converter having an improved governor as above described, the governor including means sensitive to both speed and acceleration of the output shaft, these sensing devices being coordinated to actuate the pitch control means instantaneously upon change in load conditions.

It is a further object to provide an improved governor of this type which includes a novel speed-sensitive spring construction for imparting a wide range of speed adjustability to the governor.

It is also an object to provide an improved governor of the above nature which has acceleration-sensitive spring means of novel construction which serves to minimize friction in the moving governor parts.

It is a further object to provide, in one form of the invention, an improved governor of the above nature having novel means for counterbalancing the forces of gravity and inertia on the moving governor parts when the mechanism is carried by a moving body such as an airplane.

It is also an object, in one form of the invention, to provide an improved power transmission device having novel means for maintaining speed control of the output shaft at very low loads, and to counteract the effect of viscous drag on the turbine.

It is another object to provide a novel and improved combination of governor and torque converter as above described, which is versatile in application and can be used in conjunction with a variety of controlled operations, such as winding, measurement of thickness or heat treating processes.

Other objects, features, and advantages of the present invention will become apparent from the subsequent description, taken in conjunction with the accompanying drawings.

*General arrangement*

Figure 1:
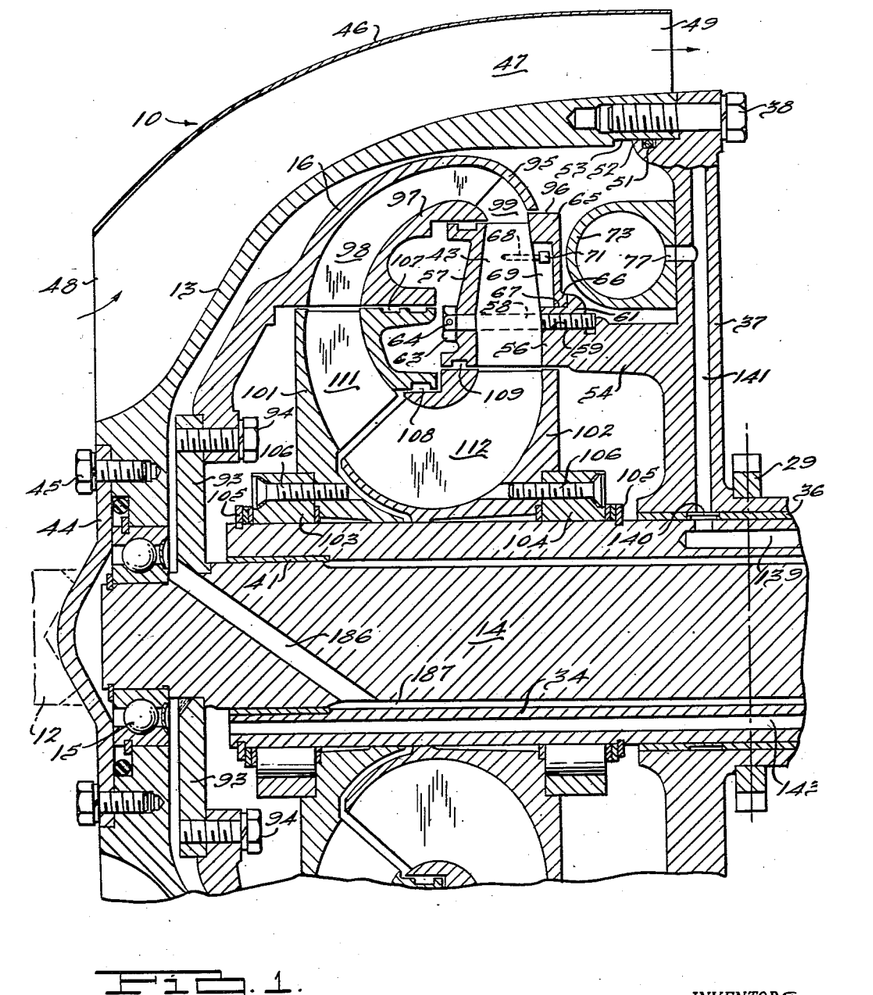
Figure 1 is a side elevational view in cross-section of the torque converter portion of the assembly, parts being broken away and moved out of their plane for purposes of clarity.
Figure 2:
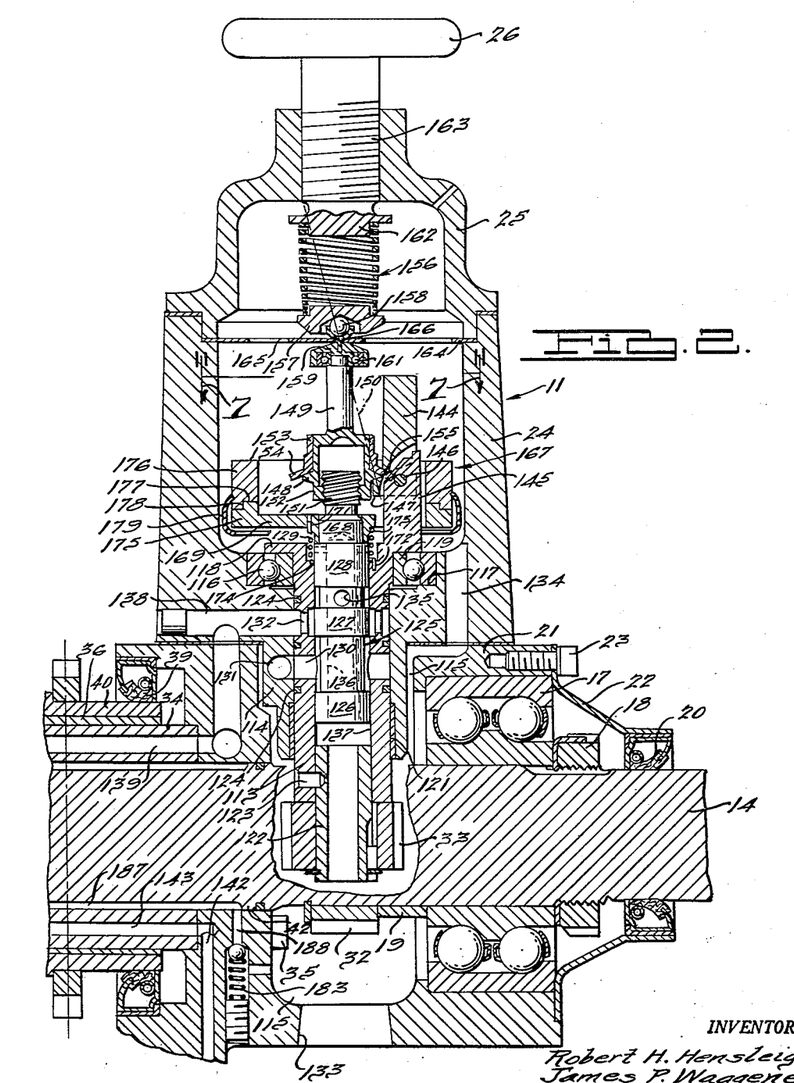
Figure 2 is a side cross-sectional view of the governor portion of the assembly.
Figure 3:
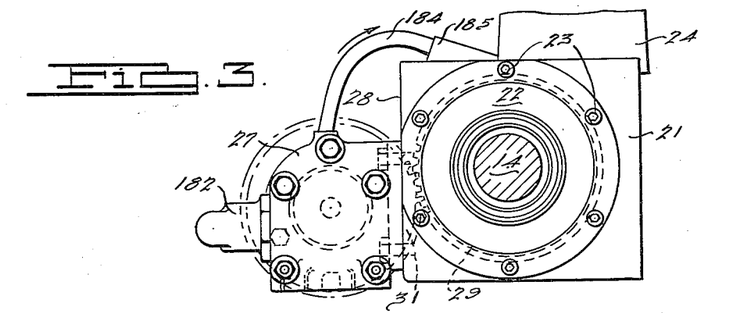
Figure 3 is an end elevational view of the governor housing and support, showing the pump mounting means and its driving connection from the input shaft.

The invention comprises a torque converter unit generally indicated at 10 and a governor unit generally indicated at 11 which controls the variable means within the converter. The input shaft 12, shown in dot-dash lines, is rigidly connected to the rotating housing 13 of the converter carrying the impeller and is driven by any prime mover (not shown) such as a gas engine or an electric motor. Since the converter will be described as being used to adjustably control the speed of the output shaft, it will be assumed that the driving means for the input shaft 12 is of a constant speed type. The output shaft 14 is aligned with the input shaft and is supported at the end adjacent the input shaft by a bearing 15, preferably of an antifriction type. The output shaft is rigidly connected to the turbine 16 of the converter and its outer end is supported by an antifriction bearing 17 shown in Figure 2 held between a lock nut 18 and spacer 19 and protected by an oil seal 20. Bearing 17 is supported by a stationary housing 21, this housing serving to support the governor 11. As seen in Figure 3, the housing 21 is of generally rectangular shape and a support 22 which is provided for the oil seal 20 is secured to its outer end by bolts 23. Surmounting the housing 21 is a governor supporting structure 24 which extends upwardly and contains the governor elements, this structure being enclosed by a vented cover 25, with a speed setting knob 26 accessible above the cover.

A pump 27 is provided for supplying fluid under pressure to the converter and governor, and this pump is preferably secured to side 28 of housing 21. In the illustrated embodiment pump 27 is adapted to be driven from the input shaft by means of a driving gear 29 connected to converter housing 13 and meshing with a driven gear 31 on the pump shaft. The governor is driven from output shaft 14 by means of a driving gear 32 on the output shaft meshing with a driven gear 33. Housing 21 supports bearing 17 for the output shaft, and extending from housing 21 concentrically with shaft 14 is a reaction torque tube 34 which serves to align the parts and supports the stator portions of the converter. Reaction torque tube 34 is secured to housing 21 by means of a plurality of bolts 35 so that the torque tube is held stationary. As will be later explained in detail the housing 21 and torque tube 34 also serve to hydraulically connect the governor 11 with the pitch control means in the impeller. A bearing 36 on the torque tube serves to support the impeller mounting flange 37 which is secured to rotating housing 13 by bolts 38, and an oil seal 39 is preferably disposed between the hub 40 of the impeller mounting flange and the adjacent portion of housing 21. The other end of the reaction torque tube carries an interior bearing 41 which supports output shaft 14, the output shaft also having a sealing ring 42 within housing 21.

The operation in general terms may be said to consist of a continuous control by governor 11 of a plurality of variable pitch impeller blades 43 carried by rotating housing 13, the governor being in turn sensitive to the speed of output shaft 14 fixed to turbine 16. The governor is set at a desired speed by turning adjusting knob 26. If the output shaft speed varies from the selected speed the governor will act to change the pitch of impeller blades 43 to compensate for the discrepancy. Changing the impeller blade angle will change the fluid pressure and rate of flow delivered to turbine 16, thereby changing the torque available to drive the turbine. This in turn will result in a change of output shaft speed which when sensed by the governor will readjust the impeller blades to the new load condition. This brief description of the operation is intended merely as a general picture, and a more detailed operational description will be found below.

*Torque converter*

The torque converter 10 is enclosed by the converter housing 13 fixed to input shaft 12 by means of flange 44 and bolts 45. This housing is of generally flared or cup shape and is surrounded by a sheet metal shroud 46 spaced from the housing 13 by fins 47. The shroud fins serve to cooling the housing 13 during operation, and for this purpose the ends 48 and 49 of this structure are open, the air following the path of the curved arrows in Figure 1. The wide end of housing 13 is closed by impeller mounting flange 37 which is of generally radial disk shape and is mounted on bearing 36 supported by reaction torque tube 34. A seal 51 is preferably held by a mounting shoulder 52 of the mounting flange against the inner surface 53 of the housing 13. The impeller mounting flange further comprises an axially extending intermediate annular supporting wall 54 for mounting the impeller blades 43. This wall is spaced about midway between the reaction torque tube 34 and the outermost portion of housing 13, and extends axially about one-third of the depth of the housing.

Figure 4:
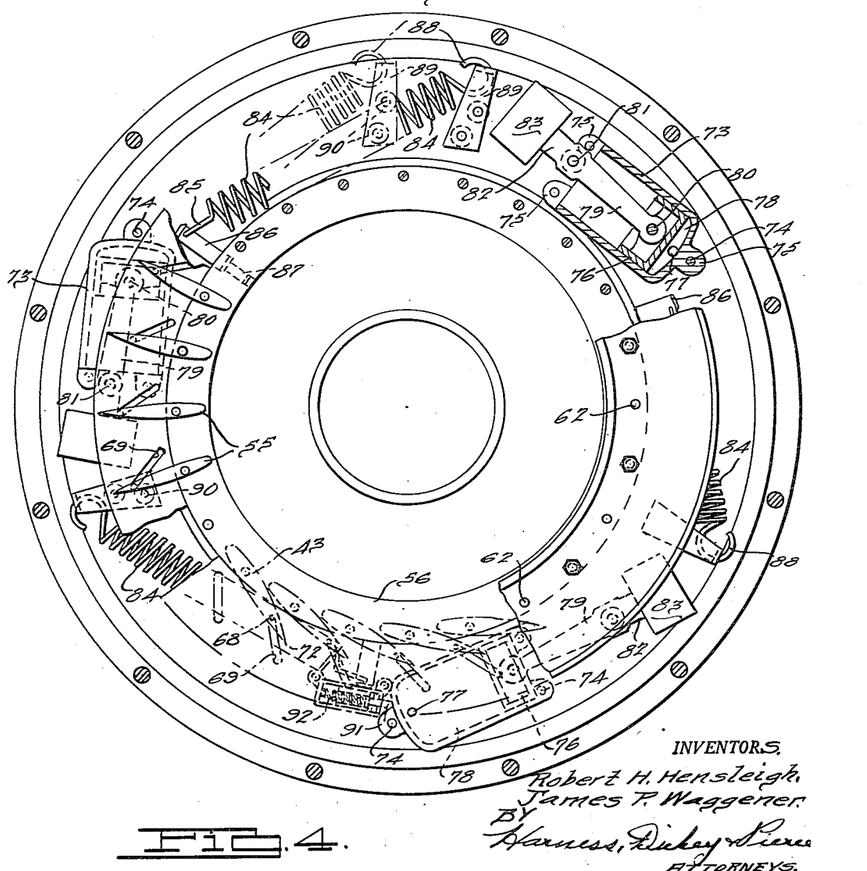
Figure 4 is a front elevational view of the impeller blade pitch control means, parts being broken away and cross-sectioned for clarity.
Figure 5:
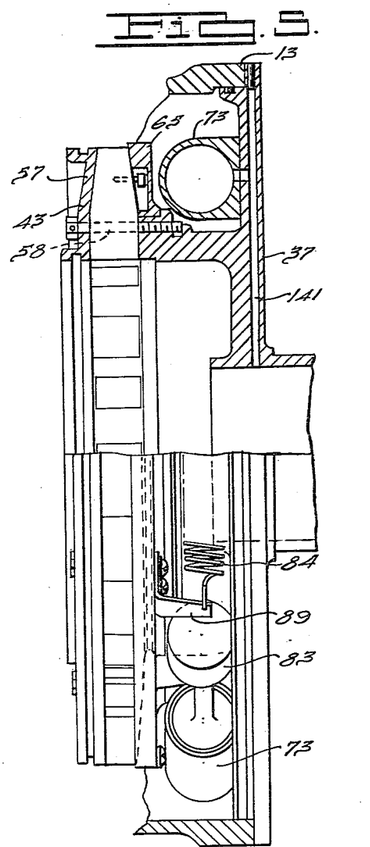
Figure 5 is a side elevational view of the impeller blade pitch control means, partly in cross-section showing the spring mounting means and the inner shroud.

The impeller blades 43 are preferably designed to impart the most efficient flow to the fluid passing therebetween, and as seen in Figure 4 are of somewhat wing foil shape with their leading edges 55 facing the flow and their surfaces altering the course of fluid. The number and size of these impeller blades will of course vary with the requirements of the unit, and the blades are circumferentially spaced and pivotally mounted on the inner end 56 of annular wall 54. In particular, the blades are held in position by an inner shroud ring 57 facing end surface 56, and a plurality of bolts 58 pass through this inner shroud ring and alternate blades, and are threadably secured in threaded apertures 59 disposed in a flange 61 on wall 54. Bolts 58 therefore serve to pivotally support alternate impeller blades 43 and also to support the inner shroud ring. The remaining impeller blades are pivotally supported by pivot pins 62 which are mounted in flange 61 and shroud ring 57 but do not serve to secure the shroud to the flange. The securing bolts 58 preferably have heads 63 through which passes locking wire 64.

The blades 43 are adapted to be pivoted in unison, and for this purpose a synchronizing ring 65 is provided which is rotated by the pitch control means and which serves to actuate the blades. Synchronizing ring 65 has a hub 66 which is rotatably mounted on a bearing surface 67 of flange 61 and faces the inner shroud ring 57. The shroud ring 57 and synchronizing ring 65 together form walls which contain the flow of fluid between the impeller blades, and these two parts are so shaped that they incline toward each other in a radially outward direction, as seen in Figure 1. The blades 43 are tapered in an outward direction to correspond with the inclined surfaces of members 57 and 65 so that the desired fluid flow characteristics will be produced. It will be noted that radially inwardly of the pivot bolts 58 (or pivot pins 62) the width of the blades is approximately constant and that the tapered portions of the blades in the illustrated embodiment start outwardly of the pivotal supports. It will also be noted that the blades as shown are pivotally supported about one-third of the distance outwardly from their inner edges 55.

The means for operatively connecting blades 43 to synchronizing ring 65 comprising a plurality of impeller blade setting pins 68 extending axially from the blades into a plurality of diagonal slots 69 in the facing surface of the synchronizing ring, the slot in Figure 1 being shown out of its true plane. The pins 68 are preferably provided with rollers 71 or other means for reducing the friction between the slots and the pins, and the pins are disposed about one quarter of the distance inwardly from the trailing edges 72 of the blades. The length and angularity of slots 69 are such that when the synchronizing ring 65 is rotated relative to its supporting flange 61, pins 68 will slide in slots 69 to cause pivotal movement of the blades. In the preferred embodiment the limiting portions of this movement are shown in Figure 4, wherein some of the blades are shown in their extreme open position in which they are approximately radial, and others are shown in their extreme closed position with the blades practically tangential to the flange 61. When the blades are in their open position, it will be seen that they will serve to greatly increase the tangential velocity of fluid passing therebetween, whereas with the blades in closed position, the increase in tangential velocity is relatively small. It will be noted that rollers 71 will be prevented from falling off their pins by the bottoms of slots 69.

The means for actuating or rotating the synchronizing ring 65 preferably comprises a plurality of pitch control cylinders 73 which are secured to impeller mounting flange 37 inside housing 13 and radially outwardly of impeller supporting wall 54. Three such cylinders are shown in the illustrated embodiment, although it will be understood that a different number of cylinders may be used if desired. The cylinders are rigidly secured to the flange 37 by means of a plurality of mounting bolts 74 passing through ears 75, and the axes of the cylinders are generally tangential to the wall 54. The cylinders hold pistons 76 which are adapted to be actuated by fluid passing through ports 77 in the head portions of the cylinders to cylinder chambers 78. It will be noted that only a single port is used for each cylinder, although more than one port could be used if desired. Each piston has a piston rod 79 connected thereto by a wrist pin 80 and the piston rods are pivotally secured to the synchronizing ring 65 by crank pins 81. Each piston rod 79 has an extension 82 on the other side of crank pin 81 which supports a counterweight 83, the counterweight being used to counterbalance centrifugal forces on the piston rod when the device is in operation to decrease the friction between the piston and cylinder.

The pistons are so arranged that when they are moved outwardly within the cylinders the synchronizing ring 65 will rotate counterclockwise as seen in Figure 4, thereby rotating the blades individually counterclockwise toward their tangential position. This action is accomplished, as will be later seen, by an increase in pressure in chambers 78, and to aid this operation a plurality of tension coil springs 84 may be provided. These coil springs are interposed between the cylinders and are disposed in a generally tangential manner. One end 85 of each spring 84 is anchored to a post 86 extending radially from wall 54, the posts being threadably secured to the wall by threaded extensions 87. The other end 88 of each spring is secured to a clip 89 mounted on synchronizing ring 65 by bolts 90. It will therefore be seen that when the synchronizing ring is rotated to its clockwise or open position, the springs 84 will be under relatively greater tension, as shown by the solid lines in Figure 4, whereas counterclockwise movement of the synchronizing ring will lessen the tension of the springs, as shown by the dot-dash lines. It may be stated here that the clockwise synchronizing ring movement is accomplished by a pressure differential across pistons 76, the chamber 78 being vented so that the fluid pressure within housing 13 will force the pistons inwardly. To prevent the blades suddenly snapping closed due to venturi action when they approach their tangential position, a plurality of buffers 91, one of which is shown in dot-dash lines in Figure 4, are mounted on ring 65 adjacent the head of each cylinder 73. When the blades approach their closed position these buffers will engage the cylinder heads and be retracted against the action of springs 92 within the buffer, these springs approximately balancing the forces of venturi action.

The turbine 16 is adapted to receive the fluid driven by impeller blades 43 and to transmit the torque to output shaft 14. For this purpose the turbine is secured to flange 93 of the output shaft by bolts 94, and extends in a flared or cupped manner within housing 13 toward the impeller. The turbine comprises an outer wall 95 which is contiguous with the outer surface 96 of the synchronizing ring 65, and inner wall 97 which is contiguous with inner shroud 57 of the impeller. Between these walls are disposed a plurality of turbine blades 98 which extend in curved fashion from the entrance section 99 of the turbine radially inwardly toward the stators. It should be noted that the turbine blades are shown in Figure 1 out of their true plane, since it would be impossible to illustrate in one figure the doubly curved nature of these blades. However, it will be understood that the curvature of blades 98 is such as to redirect the tangential component of the fluid velocity so as to transmit the torque from the impeller to the turbine.

After the fluid leaves the turbine 16 it passes through the stator portion of the converter, and in the illustrated embodiment this portion comprises a stator entrance section 101 and a stator exit section 102. These sections are rotatable independently of each other, and are mounted for rotation on reaction torque tube 34. The mounting means preferably comprises a mechanism for permitting the free wheeling of the stators upon the attainment of the proper torque and speed ratios, and for this purpose the entrance section 101 is mounted on a free wheeling clutch 103 of any suitable type whereas the exit section 102 is mounted on a free wheeling clutch 104. These clutches may be of a similar type and are held against axial movement on the reaction torque tube by locking means 105, while the clutches are secured to their respective stator sections by bolts 106. The stators serve the conventional function of redirecting the fluid from the turbine to the impeller. In particular, the stator entrance section 101 is contiguous at one end with the exit portion of turbine 98, sealing means 107 being provided between the turbine and stator entrance section. The other end of section 101 is contiguous with the stator exit section, sealing means 108 being provided therebetween, and the stator exit section in turn is contiguous with the impeller, sealing means 109 being provided between these two parts. Again it should be kept in mind that the blades 111 of the stator entrance section and the blades 112 of the stator exit section are not shown in their true plane in the drawing, which merely shows their radial disposition but not their circumferential extent.

The operation of the torque converter will be apparent from the above description. With the impeller blades set at a particular pitch, rotation of input shaft 12 will cause rotation of the blades about the shaft axis, forcing the fluid outwardly therebetween at an increased velocity. Assuming the output shaft 14 to be initially stationary, this fluid will react against the blades of turbine 16, imparting maximum torque to the output shaft. As the speed of this shaft increases, the turbine will receive less torque from the fluid, the remaining energy being redirected by the stationary stator sections 101 and 102 toward the impeller. During the operation stators 101 and 102 will move on their free wheeling clutches in the conventional manner. When it is desired to lower the speed of output shaft 14, the pistons 76 will be forced outwardly within their cylinders 73, rotating synchronizing ring 65 counterclockwise relative to the impeller housing, this rotation being aided by springs 84. Pins 68 of the impeller blades 43 will slide in slots 69, swinging the blades counterclockwise about their individual pivots and reducing the tangential component of impeller discharge. The reduced volume of fluid forced against turbine 16 will therefore reduce the output shaft speed. Likewise, when it is desired to increase output shaft speed, pistons 76 are driven into their respective cylinders to rotate synchronizing ring and blades 43 clockwise, the increased volume of fluid driving the output shaft at a faster rate. During this movement of the pistons, the frictional losses against the cylinder walls will be minimized by the action of counterweights 83 which will counteract the centrifugal forces tending to bind the pistons and cylinder walls, this counterbalance acting through the moment forces on piston rod 79.

*Governor mechanism*

The governor 11 is supported within housing 21 and enclosure 24, and comprises a hollow governor shaft 113 which is disposed within a shaft support 114. This shaft support extends downwardly from enclosure 24 within an opening 115 in housing 21, and the shaft 113 is supported for rotational movement within its support by an antifriction bearing 116 resting on a shoulder 117 in enclosure 24. The upper end of shaft 113 is provided with a shoulder 118 resting on bearing 116, the shaft below this shoulder being press fitted within the inner race 119 of the bearing. The lower end of shaft support 114 is provided with an additional bearing 121 for the shaft, and at the lower end of the shaft is secured gear 33 which is driven by gear 32 mounted on the output shaft 14. Gear 33 is preferably secured to shaft 113 by means of a hollow sleeve 122 and pin 123. The shaft is also preferably provided with a plurality of oil seals 124 at spaced points along its length.

Slidably mounted in hollow shaft 113, which also serves as porting means for the governor, is a slide valve generally indicated at 125, this valve serving to control the fluid flowing to and from the pitch control cylinders. The valve comprises three spaced lands 126, 127 and 128, and the upper end of the valve is yieldably connected to the rotatable shaft 113 by an accelerometer torsion spring 129 as described in detail below. The sliding movement of the valve 125 within shaft 113 controls a plurality of ports, and in particular the shaft is provided with a port 130 supplied by passage 131 in the housing for receiving fluid from pump 27, and a port 132 for connection to the pitch control cylinders. The hollow sleeve 122 leads to opening 115 within housing 21, this opening being connected by a drain 133 to the sump as later described. A drain passageway 134 for enclosure 24 is also provided, this passageway connecting with opening 115. Between lands 127 and 128, valve 125 is provided with a radial port 135 connecting with an axial passageway 136 which extends downwardly and connects with the bore 137 of shaft 113, so that fluid flowing into port 135 will drain to the sump through hollow sleeve 122.

Port 132 is connected to the pitch control cylinders by means of a series of passageways including a passageway 138 in the base of housing 24 leading to a passageway 139 through the reaction torque tube. The latter passageway leads to an annular groove 140 on bearing 36, from which a plurality of radial passageways 141 in impeller mounting flange 37 carry the fluid to ports 77 of the pitch control cylinders. The supply fluid for the converter housing itself is carried by a passageway 142 in housing 21 leading to a passageway 143 in the reaction torque tube, the latter passageway leading to the housing.

The valve 125 is slidable within shaft 113 between an upper or blade-closing position and a lower or blade-opening position, Figure 2 showing the valve in its intermediate or locking position. A study of Figure 2 will show that when valve 125 is raised, fluid can flow from port 130 to port 132 between lands 126 and 127. This fluid will eventually enter ports 77 of the pitch control cylinders, thereby forcing the impeller blades toward their reduced volume position. When valve 125 is moved downwardly, port 130 will be cut off, but fluid can flow from port 132 through port 135 between lands 127 and 128, and this will allow fluid from the pitch control cylinders to drain to the sump and open the blades. It should be observed that the amount of travel of pistons 76 in cylinder 73 can be controlled by varying the amount of fluid in cylinder chambers 78, this amount being controlled by the movement of valve 125. When this valve is in its intermediate or locking position, it will be seen that fluid can neither enter nor leave chambers 78, since port 132 is blocked by land 127.

*Speed sensing mechanism*

Means are provided for controlling the position of valve 125 relative to ported shaft 113 in accordance with the speed and acceleration of output shaft 14. The speed sensing mechanism includes one or more centrifugal weights 144 which are connected to upwardly extending portions 145 of shaft 113. In the illustrated embodiment two such weights are shown; however, one of these weights is shown out of its plane in Figure 2 so that other parts of the mechanism may be illustrated. Weights 144 are of generally elongated shape, their lower ends being pivotally secured to extensions 145 by means of pivot pins 146. The weights are provided with lower extensions 147 which are adapted to engage the underside of an annular shoulder 148 on a spindle member 149. It is preferred that the coaction between elements 147 and 148 be similar to an involute rack and pinion action, and for this purpose the contact surfaces of extensions 147 have an involute shape. It will be seen that the line of action of the weights against the shoulder 148, as indicated by the dot-dash line 150 in Figure 2, passes through the upper supporting point of spindle 149, described in detail below. This prevents any possible cocking action on the valve due to variations in the masses of the weights during rotation of the parts.

The spindle member 149 is threadably connected to the upper end of valve 125, the valve having an upper portion 151 threaded in a lower extension 152 of the spindle. This threaded connection is preferably of a substantial pitch so that relative rotation of the spindle and valve of less than 90° will still mean considerable relative axial movement between the parts. The engagement between projections 147 of the weights and shoulder 148 is such that when the weights are thrown outwardly due to rotation of shaft 113, the shoulder 148 will be raised, thus lifting valve 113 to move the impeller blades toward a tangential position. On the other hand, when weights 144 swing inwardly due to smaller output shaft speed, valve 125 will be allowed to drop, venting the pitch control cylinders and allowing the fluid pressure in housing 13 to move the impeller blades toward a radial position. The weights are shown in Figure 2 in an intermediate position.

Means are provided for insuring the rotation of valve extension or spindle member 149 with shaft 113, and this means preferably comprises a sleeve member 153 fixedly mounted on member 149. This sleeve has an outwardly extending flange 154 with a slot 155 within which the lower portion of each weight 144 is disposed. When the shaft 113 is rotated, the rotating weights will drive sleeve 153, thus rotating valve extension member 149. The details of accelerometer spring 129 which resiliently connects valve 125 to the rotating shaft 113 are described below.

Adjustable resistance means are provided for counteracting the centrifugal action of weights 144, and this means preferably comprises a coil compression spring generally indicated at 156 which is disposed between the cover 25 and the shaft extension member 149. In particular, this spring, which is of novel shape as described below, is supported at its lower end by a retainer 157 mounted for universal movement on a ball member 158. This ball member is in turn supported by a connecting member 159 between the retainer 157 and the valve extension member 149. The connection between members 159 and 149 comprises an antifriction bearing 161, and it will be seen that due to this connection the member 149 is allowed free rotation without interference from its upper connections. Ball member 158 of course allows retainer 157 to rock in the event of uneven lateral pressure on spring 156. The upper end of the spring is retained by the lower end 162 of an adjusting screw 163 which is surmounted by adjusting knob 26. Screw 163 is threadably mounted in cover 25 which is secured to the top of enclosure 24, and a flat hinge support comprising a ring 164 and an inner radial extension 165 is secured between the cover and the enclosure. Extension 165 acts as a flat spring for supporting the neck portion 166 of member 159 against lateral movement while yielding in a vertical direction.

Figure 6:
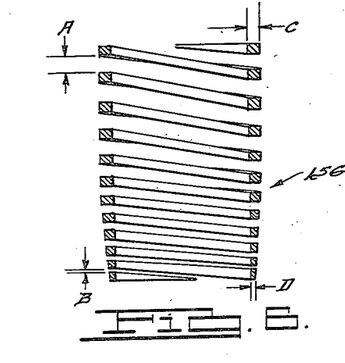
Figure 6 is a detail view of the speed sensing spring.

The spring 156 is shown in detail in Figure 6. This spring is so constructed as to have an extrordinarily large change of spring rate as the spring is compressed, beginning with a very low spring rate at the beginning of compression and building up to an extremely high spring rate toward the end of compression. This large working range is achieved by constructing the coils of variable pitch, with the coils at one end being of relatively large pitch as shown by the distance A, and the coils at the other end being of relatively small pitch as shown by the distance B. In the illustrated embodiment, a linear variation of this pitch is utilized, although it would be possible to use other variations if desired. The spring may also be constructed with a variable moment of inertia in the wire cross-section, with the coils of narrowest pitch having the smallest moment of inertia, and the coils of widest pitch having the greatest moment of inertia. This can be achieved for example by grinding or otherwise reducing the cross-sectional area of the coils after they have been formed, by an inclined movement of the cutting or grinding tool along the coils which are originally of constant diameter. This is shown in Figure 6, wherein it will be seen that the thickness C of the coils having the greatest pitch is relatively large, whereas the thickness D of the coils of smallest pitch is relatively small. As a result of this novel spring construction, the initial compression of the spring is accomplished at a very low spring rate, but as the coils of smallest pitch and lowest moment of inertia become solid, the rate will rapidly increase.

In operation, the spring 156 can be installed between the holding members 157 and 162 with either the wide pitch or narrow pitch coils uppermost, the former arrangement being illustrated. After calibrating the device a particular output shaft speed can be chosen by merely adjusting knob 26 to apply the proper initial compression to the spring. When the unit is started, valve 125 will be initially held in its lowermost position, venting the pitch control cylinders and allowing the impeller blades to be maintained in a fully radial position. As the predetermined output shaft speed is reached and passed, weights 144 will overcome the spring force, lifting valve 125 so as to move the impeller blades toward their closed position. By successive approximation the unit will quickly bring the output shaft speed to its chosen rate, the valve centering on its locking position as shown in Figure 2.

An advantage of the novel non-linear spring rate construction is that it imparts a high degree of sensitivity to the governor throughout a wide speed range, since the ratio of spring rate to weight rate approaches a constant value. Weight rate may be defined as the slope of the line which shows varition of axial force exerted by the weight with angular position of the weight. Since this force also varies with the square of the angular velocity, the weight rate is considerably greater at higher than at lower shaft speeds. In any governor installation of this type, the weight rate must always be less than the spring rate in order to achieve stable operation and avoid hunting. Conventional governors using linear spring rates therefore suffer from a lack of sensitivity at low speeds or a lack of stability at high speeds, or both. In the present improved construction, the spring rate will increase along with the weight rate as higher shaft speeds are encountered, so that the ratio of these two rates will approach a constant value. The result is therefore a high degree of governor sensitivity throughout a wide range of chosen output shaft speeds.

*Accelerometer mechanism*

As stated previously, the governor 11 senses changes in acceleration as well as speed of the output shaft 14, and these sensing functions are combined to impart a resultant movement to valve 125. The accelerometer elements include a flywheel generally indicated at 167 having a hub portion press fitted on a reduced portion 168 of valve 125 immediately below upper threaded portion 151. This flywheel has a plurality of spokes 169 and generally surrounds the extensions 145 of shaft 113 within enclosure 24. The torsion spring 129 connects flywheel 167 with shaft 113, this torsion spring surrounding valve 125 below the flywheel and having its opposite ends 171 and 172 secured in appropriate apertures in the flywheel and shaft respectively. The unstressed coil diameter of spring 129 is such that space will exist inside and outside the coils for radial movement during operation.

The spring 129 serves the dual function of accelerometer and weight support for the flywheel 167 and valve 125. It will be realized that the dead weight of the flywheel and valve would ordinarily create substantial friction between threaded portion 151 of the valve and its nut member 152. To prevent this, spring 129 has the proper axial load characteristics to support the dead weight of the flywheel and valve, thereby minimizing the friction in the threaded connection. Since during operation there is relative vertical movement between the valve and governor shaft, the length of spring 129 will change so that the counterbalancing effect can only be approximate. In practice, the spring is designed to give the optimum counterbalance effect in an intermediate position. The accelerometer function is accomplished by providing spring 129 with the proper torsional characteristics, and the end coils 173 and 174 of the springs are anchored to the flywheel and shaft respectively to allow the torsional action to take place.

Figure 7:
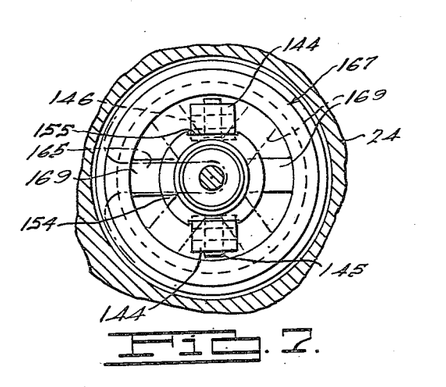
Figure 7 is a plan view of the governor showing the disposition of the flywheel and weights.

As best seen in Figure 7, the weights 144 are disposed between the spokes 169 of the flywheel, so that the flywheel is permitted a limited rotational movement with respect to the weights. In the illustrated embodiment this rotational movement is limited to about 55° in either direction as shown by the dot-dash lines, although it will be appreciated that other degrees of movement could be used. The relative rotational movement will occur of course when there is a change of acceleration in the output shaft. The inertia of the flywheel will tend to cause valve 125 to rotate at a constant speed, so that when shaft 113 is changing its rotational speed, the flywheel and valve will rotate relative to the shaft and valve extension 149, the latter being positively connected to the shaft through slots 155. This relative rotation will cause threaded portion 151 of the valve to move vertically within nut 152, so that the valve will move vertically within the shaft, the amount of this relative rotation of course depending on the torsional rate of the spring 129. In particular, if there is a positive acceleration of the output shaft the flywheel will lag, thus moving valve 125 upwardly within the shaft. This will in turn cause ports 131 and 132 to be connected, forcing fluid into the pitch control cylinders to reduce the impeller blade angle. Such action will of course counteract the accelerating tendency of the output shaft by reducing the power delivered momentarily to the turbine. Likewise, a deceleration of the output shaft will cause downward movement of valve 125 to partially vent the pitch control cylinders, increasing the impeller blade angle to counteract this deceleration.

The advantages accruing from accelerometer action in the governor will be apparent when we consider that upon a temporary change of speed of the output shaft, due to change in load condition, there would normally be a time lag before the new quantity of fluid delivered to the turbine by the pump actually causes a corresponding change of power delivered to the output shaft. This is due at least in part to the hydraulic connections between the governor and the pitch control cylinders as well as to other retarding factors inherent in the construction. Since the acceleration cycle always is out of phase with the speed cycle by a leading angle, the accelerometer action of the governor serves to anticipate velocity variations by changing the impeller blade angles before the weights themselves act. Thus, the speed and accelerometer functions of the governor are continually combined to give the proper resultant valve position.

It will be observed that the accelerometer portions of the governor in no way interfere with the functions of the speed sensing governor elements. The spring 156 is counterbalanced, when the device is operating, solely by the weights 144, these weights also counteracting the dead weight of the valve extension 149 and the connecting parts between this extension and spring 156. When the weights swing in either direction, the whole assembly including the flywheel will move vertically, so that the torsion spring 129 will change its length. However, the elongation or contraction of spring 129 will not appreciably affect its torsional properties so that the accelerometer action still occurs normally. Likewise, relative movement between threaded portion 151 and nut 152 due to accelerometer action will not effect the balancing effect of speed selector spring 156.

Means are provided for preventing harmful effects when relatively great acceleration or deceleration of the output shaft occurs. It will be seen that since the arc of movement of the flywheel 167 is limited by the engagement of its spokes 169 with shaft extensions 145, rapid change of speed would cause the spokes to strike these extensions, causing the flywheel to rebound in the opposite direction and resulting in harmful effects on the governor action. Ordinary friction damping means between the shaft and flywheel could not be used effectively to prevent this harmful action, since the torsion spring 129 would be too weak to center the flywheel after it had been displaced if such frictional damping were present. The problem is solved in the present instance by a novel form of flywheel which includes a base portion 175 and a free or floating portion 176 surmounting the base portion. The juncture 177 of these two parts comprises two annular mating surfaces having a shoulder 178 to prevent lateral slippage, and a guard 179 may also be provided to prevent accidental removal of the floating portion 176. The juncture 177 permits free rotation of portion 176 on the base portion, although normally friction due to the weight of the floating portion will keep these parts moving in unison. However, when sudden acceleration causes spokes 169, which are on the base portion, to strike extensions 145, portion 176 will be free to continue its rotation, and the resultant frictional forces acting on base portion 175 will prevent the base portion from rebounding in the opposite direction. Thus the valve 125 will not move up and down with an erratic motion but will be held in its limiting position until the flywheel backs away from its contact position. It will be observed that the damping means thus provided in no way prevents the flywheel from again being centered by torsion spring 129, since there is no frictional connection between the flywheel and shaft 113.

*Fluid pressure supply system*

The purposes of the fluid pressure supply system are to supply operating fluid to the converter housing itself and to supply control fluid under proper pressure to the governor from whence it is delivered to the pitch control cylinders. It is necessary to supply fluid under pressure to the converter housing in order to fill the unit after being idle, to insure a constant interchange of converter oil with sump oil, and to prevent cavitation within the unit. In the present invention the pressure supply to the converter housing also serves the additional purpose of regulating the pitch of the impeller blades which depend for their movement upon the pressure differential across the piston faces.

Figure 8:
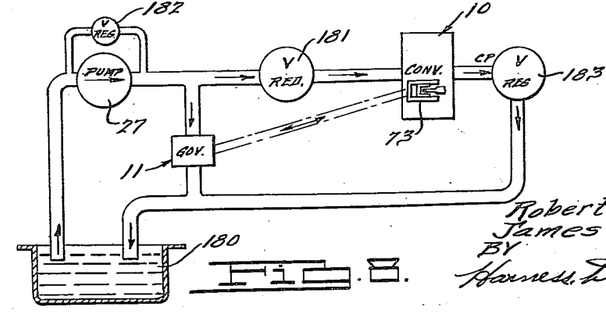
Figure 8 is a hydraulic diagram of the fluid circulating system for the torque converter.

These objects are accomplished in the preferred embodiment by a fluid pressure supply system such as that illustrated in Figure 8, although it will be understood that other supply systems could be used within the principles of the invention. The pump 27 which as described previously is driven from the input shaft by means of gears 29 and 31, draws fluid from sump 180 and delivers the fluid to the converter 10 through a reducing valve 181 and to the governor 11 directly. A safety or pressure relief valve 182 is preferably provided for the pump, this valve being shown as mounted on the pump casing in Figure 3. The reducing valve maintains a constant pressure differential between its inlet and outlet, so that the fluid pressure to the governor is always greater than that to the converter. From the converter the fluid leads back to the sump through a regulating valve 183 having a constant pressure inlet, so that the pressure of fluid within the converter is maintained substantially constant. Fluid from the governor is carried to the pitch control cylinders when valve 125 is in its upper position, and is drained from these cylinders to the sump when the valve is in its lower position.

The connection between the pump and governor, which is shown schematically in Figure 8, is shown structurally in Figure 3 and consists in the illustrated embodiment of a conduit connection 184 from the pump 27 to an inlet boss 185 above housing 21, from where it is led by a series of interior conduits (not shown) to passageway 131 and port 130. The connection from the reducing valve 181 to the converter 10 is, as stated previously, by means of conduit 142 leading to passageway 143 in the reaction torque tube 34, this passageway connecting in turn with the interior of the housing. The fluid under pressure will eventually leave the converter through the inclined passageway 186 in output shaft 14, this passageway connecting the housing interior with an annular space 187 between shaft 14 and the reaction torque tube. Space 187 is in turn connected with a passageway 188 in casting 21, the latter passageway leading to the sump drain opening 133 through pressure regulating valve 183.

*Operation*

Although the operations of specific portions of the unit are described in appropriate sections of the description, it is believed that a description of the over-all operation of the unit will enhance an understanding of the invention. Assuming an initial condition in which the converter unit is idle and it is desired to drive output shaft 14 at a constant predetermined speed by means of constant speed driving means connected to input shaft 12, the speed adjusting knob 26 will be set to the desired speed, thus imparting the proper initial compression to spring 156. It will be noted that, as described previously, the speed can be chosen within a very wide range because of the novel construction of spring 156 which gives it a spring rate varying between wide limits. When the device is idle the weights 144 will be inclined inwardly and the accelerometer flywheel 167 will be centered, thus maintaining threaded portion 151 of valve 125 in an intermediate position. The valve will then be in its lower position, connecting pitch control cylinder port 132 with drain port 135. Upon starting the input shaft 13, the pump 27 will be actuated to cause fluid under pressure to flow to the inlet port 130, but the fluid will not flow further due to the position of valve 125. Fluid under pressure will also flow from the pump through pressure reducing valve 181 to the converter unit housing, filling the housing with fluid before returning to the sump. The fluid pressure within the housing and on the back surfaces of pistons 76 will therefore cause the pistons to be retracted within their cylinders, the fluid within chambers 78 draining to sump through governor ports 132 and 135. Movement of the piston rods will cause synchronizing ring 65 to rotate clockwise as seen in Figure 4, and the pins 68 on impeller blades 43 will slide within slots 69, causing the impeller blades to pivot into their radial position. A relatively large amount of fluid will thus be pumped to turbine blades 98, causing a high torque to be applied to output shaft 14. The fluid will be redirected by stator sections 101 and 102 to the impeller blades 43. As the output shaft begins to rotate, it will rotate governor shaft 113 and thus throw counterweights 144 outwardly. At the same time, the acceleration of the output shaft will cause relative axial movement between valve 125 and shaft 113 due to flywheel 167. The combined effects of the speed sensing and accelerometer mechanism will result in a lifting of valve 125, causing pitch control cylinder port 132 to be connected to inlet port 130. This will change the pressure differential across pistons 76, rotating synchronizing ring 65 in a counterclockwise direction as seen in Figure 4 to swing the impeller blades toward their tangential position. This will decrease the torque delivered to the turbine so that the output shaft will decrease its speed. By successive approximation and the interaction of the accelerometer and speed sensing mechanisms, the output shaft will rapidly be brought to a constant speed as determined by the setting of knob 26. In actual practice it has been found that valve 125 will ordinarily not remain stationary but will continually oscillate between narrow limits centered on its locking position of Figure 2, so as to maintain the output shaft at the proper speed. Should the acceleration of the output shaft be so great as to cause spokes 169 of the flywheel to strike extension 145 of the shaft 113, the damping means described previously and which includes floating flywheel portion 176 will prevent harmful rebounding of the flywheel.

Figures 9, 10 and 11

Figure 9:
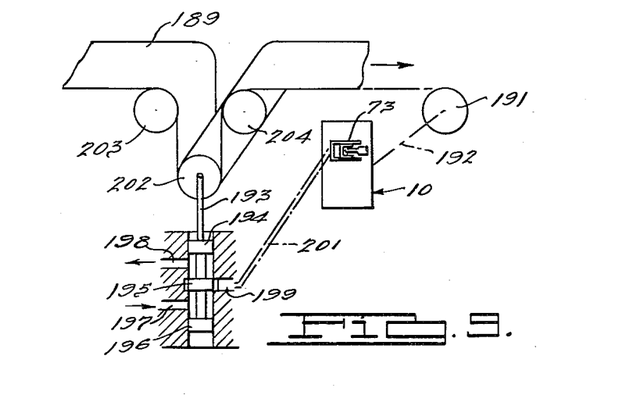
Figure 9 is a schematic view showing the governor in modified form and the torque converter used in conjunction with a winding process.
Figure 10:
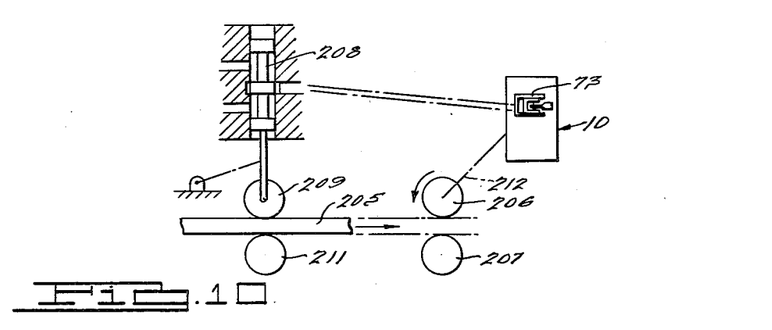
Figure 10 is a view similar to Figure 9 but showing a control for thickness in a manufacturing process.
Figure 11:
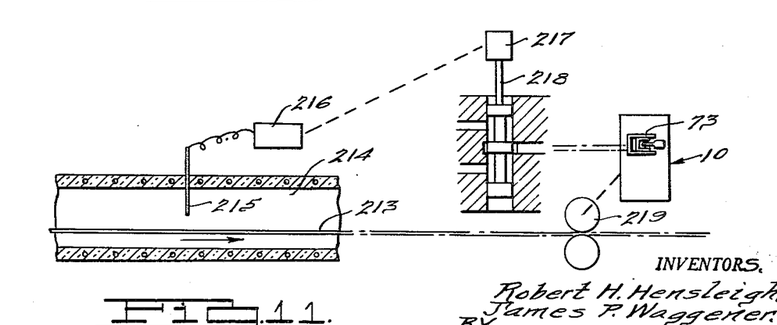
Figure 11 is a schematic view showing the invention applied to a heat-treating process for temperature control.

As indicated previously, the improved torque converter can be used in conjunction with a governor for the control of other operations such as those requiring a constant tension of material, a constant thickness or a constant treating temperature. Figures 9, 10 and 11 illustrate three such embodiments of the torque converter, although it will be understood that these are only representative of others that may be used.

In Figure 9 the converter is shown as controlling the tension in a sheet of material 189 which is being wound on a spool 191 driven by torque converter 10 through shaft 192. The pitch control cylinders 73 are controlled by a suitable governor having a reciprocating valve 193 with three lands 194, 195 and 196. These lands control a supply port 197, a drain port 198 and a port 199 leading to the pitch control cylinders 73. It will be understood that the governor mechanism shown in Fig. 9 as well as in Figs. 10 and 11 is not the same as the governor mechanism shown in the previous figures, and in particular does not embody a speed sensing mechanism, accelerometer mechanism or rotating shaft.

Port 199 is connected to the pitch control cylinders by conduit 201. The reciprocation of valve 193 is controlled by tension roller 202 which is interposed between idler rollers 203 and 204, so that a constant lateral force is exerted on the moving material 189. Upon an increase in tension in the material, roller 202 will be lifted, thereby connecting port 199 with supply port 197. The pitch control means in converter 10 will therefore act to slow down winding spool 191 to decrease the tension. Likewise, a decrease in tension below normal will let valve 193 move down and will cause port 199 to drain through port 198, actuating the pitch control means to speed up output shaft 192. It will be obvious that variable means (not shown) could be provided on valve 193 for adjusting the center of oscillation of the valve, so that the tension in material 189 could be kept at a predetermined rate.

Fig. 10 is another embodiment used to control the thickness of material 205 which is being worked by a tool (not shown) and drawn by driving rollers 206 and 207. The governor valve 208 in this case is connected to a rider 209 such as a wheel supported by idler wheel 211. Variations in thickness of the material 205 will cause valve 208 to reciprocate in such fashion as to control pitch control cylinders 73, thereby maintaining a continuously corrected speed of output shaft 212 which connects torque converter 10 with the driving rollers.

Fig. 11 shows still another embodiment which controls the movement of stock 213 through a heat treating furnace 214. In this case a thermocouple 215 adjacent stock 213 will measure the temperature of the stock and through an amplifier 216 control motor means 217 such as a solenoid or the like. This motor 217 controls the movement of governor valve 218, which valve in turn acts upon the pitch control cylinders 73 of torque converter 10. The driving roller 219, driven by the torque converter, will thus be controlled in accordance with the temperature attained by the stock within the heating furnace.

Figure 12:
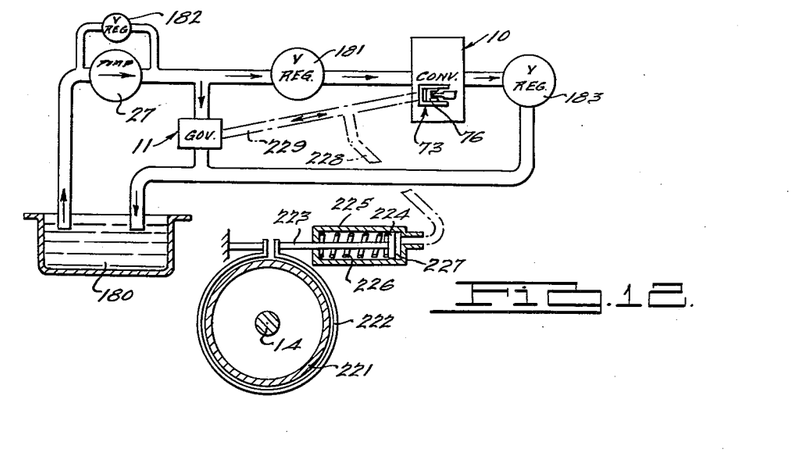
Figure 12 is a hydraulic diagram of a modified form of the converter, having means for counteracting the effect of viscous drag on the turbine at low loads.

Low load speed control device (Fig. 12)

Fig. 12 illustrates a modified form of the torque converter having means for controlling the speed of the output shaft 14 under low load conditions. It will be appreciated that when the blades are entirely backed off to their closed position so as to stop all circulation of fluid through the turbine, the viscous drag on the turbine urges its rotation at input speed. If the normal load on the turbine is less than this viscous drag, some artificial load must be imposed to maintain speed control of output shaft 14.

Fig. 12 illustrates in schematic fashion one form of this speed control mechanism comprising a brake drum 221 fixed to output shaft 14, and a brake band 222 arranged to frictionally engage the drum. In the schematic showing of Fig. 12, the brake band is shown as being actuated by a piston rod 223 having a piston 224 within a cylinder 225. A spring 226 within the cylinder normally urges the piston in a direction away from the brake band, and within the normal range of pressures to which cylinder 225 is subjected, the brake band and brake drum are kept disengaged by spring 226. The chamber 227 within the cylinder is connected by a conduit 228 to the line 229 between the governor 11 and the cylinders 73 of converter 10, so that the instantaneous pressures in line 229 are reflected in chamber 227.

It will be seen from an examination of the hydraulic diagram that when the blades are moved toward their closed position (piston 76 moving to the right in Fig. 12) the pressure within line 229 will continue to increase after the blades are closed, if necessary building up to the pressure setting of the converter regulating valve 163 plus the pressure differential across reduction valve 181. This increased pressure is thereupon transmitted through conduit 228 to cylinder 225, causing brake band 222 to frictionally grip the brake drum. The viscous drag which would normally tend to rotate output shaft 14 at the input shaft speed is thereby counteracted by this braking action. It will be noted that normally, with the blades in other than their closed position, the pressure within line 229 will not be sufficient to actuate the brake band, so that the brake will not interfere in any way with the normal operation of the converter and governor. Since the pressure within line 229 depends on the extent of the load reduction on the output shaft, the braking action of brake band 222 will be automatically applied to whatever degree it is needed to maintain speed control.

Since the brake is necessarily a work dissipating device, it would preferably be located within the converter housing where adequate cooling is available due to the cooling fins 47. Although the speed control device is illustrated as a brake, other means of applying artificial loading will become apparent. Other devices such as the following could be used: (1) a disk clutch; (2) a hydrostatic pump driven by the turbine and having its pressure controlled by governor pressure; (3) a hydrokinetic pump driven by the turbine and being controlled by governor pressure; (4) a generator driven by the turbine, the power being controlled by governor pressure. In each case, the load on the turbine is controlled by governor pressure, and this load can be applied only after the blades are no longer able to affect speed control.

Figure 13:
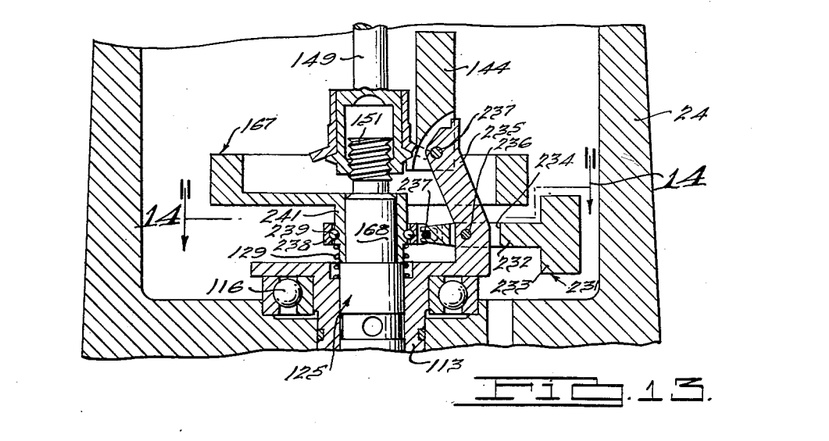
Figure 13 is a fragmentary cross-sectional view of a portion of a modified form of the governor mechanism, having means for counteracting the forces of gravity and inertia on the moving governor parts.
Figure 14:
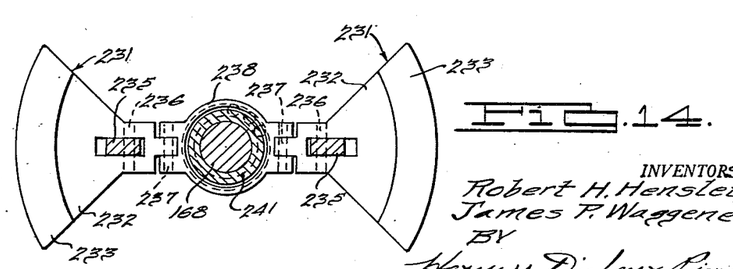
Figure 14 is a top sectional view of the mechanism of Figure 13 taken along the line 13—13 thereof.

Inertia counterbalancing means (Figs. 13 and 14)

Fig. 13 illustrates a modified form of the governor mechanism including means for counteracting the forces of gravity and inertia which may disturb the governor parts in some installations. For example, if the governor is installed on an aircraft or other such carrier subject to sudden changes in acceleration and direction, the inertia of the governor parts, such as valve 125 and flywheel 167, would seriously affect the operation of the governor. The means for counteracting this effect comprises, in the preferred embodiment, one or more counterweights, generally indicated at 231, which are connected to the valve 125 and the flywheel 167 (the latter being shown as a single piece for purposes of simplicity). In the illustrated embodiment two diametrically opposed counterweights are shown, although only one is visible in Fig. 13, which is a section similar to Fig. 2. The counterweights have generally a sector shape and each comprises a leg or web portion 232 and a thickened outer weight portion 233. Web portion 232 is provided with an aperture 234 through which passes an arm 235 corresponding to the arm 145 in Fig. 2. This arm is integral with the governor shaft 113 and rotates therewith, and the arm supports at its upper end the speed sensing counterweight 144. Counterweight 231 is pivoted to an intermediate portion of arm 235 by a pin 236, and the narrow inner end of web portion 232 has a pin and slot connection 237 with the outer race 238 of an antifriction thrust bearing 239. The inner race of the thrust bearing comprises a hub portion 241 of flywheel 167, which is fixed on upper portion 168 of valve 125. The disposition of weights 231 and the pivotal supports thereof are such that web portions 232 are horizontally disposed when the valve 125 is in neutral position, and the weight portions 233 at the outer ends of the weights counterbalance the dead weight of flywheel 67 and valve 125. In this connection, it should be noted that in the embodiment of Figs. 13 and 14 the spring 129 no longer serves the function of supporting this dead weight, but is designed for its torsional properties only.

In operation, it will be noted that the weights 231 will rotate with the governor shaft 113 and will tend to assume and maintain their horizontal position since the valve 125 will tend to maintain its neutral position. Upon sudden acceleration of the entire governor mechanism in a vertical direction, the inertia of flywheel 167 and valve 125 would normally tend to move these parts vertically with respect to governor shaft 113, thus disturbing the normal governor action. However, the inertia of weights 231 and particularly the outer weight portions 233 thereof will tend to move in the same direction as the movement of the flywheel and valve, and due to the simple lever action of these weights upon the valve and flywheel the resultant movement will approach zero. Thus, sudden accelerations of the aircraft or other carrier will not disturb the normal action of the governor parts in any way. It will be noted that due to the antifriction thrust bearing 239, the axial thrust forces of the counterweights 231 can be transmitted to the shaft and flywheel without interfering with the normal flywheel action, since the flywheel and valve can rotate independently of the counterweights.

While it will be apparent that the preferred embodiments of the invention herein disclosed are well calculated to fulfill the object above stated, it will be appreciated that the invention is susceptible to modification, variation and change without departing from the proper scope or fair meaning of the subjoined claim.

What is claimed is:

In combination, a torque converter operable to confine fluid under pressure, said torque converter having an impeller portion and a turbine portion adapted to be connected to an input and output shaft respectively, a plurality of impeller blades pivotally mounted on said impeller portion, a synchronizing ring rotatably mounted on said impeller portion, means connecting each of said blades to said synchronizing ring for movement in unison when said ring is rotated on said impeller portion, hydraulic means for rotating said synchronizing ring, said means comprising a piston and cylinder connecting said impeller portion and said synchronizing ring, a source of fluid under pressure for supplying said cylinder, governor means having fluid control elements for directing the fluid toward and away from one end of said cylinder, means for supplying fluid under pressure to said converter, said cylinder being open at the other end whereby the fluid pressure in said converter acts upon the back face of said piston, and valve means for maintaining the pressure of fluid supplied to said one end of said cylinder at a greater magnitude than the fluid within said converter.

References Cited in the file of this patent
UNITED STATES PATENTS

| | | |
|---|---|---|
| 367,330 | Barnaby | July 26, 1887 |
| 1,900,120 | Lysholm et al. | Mar. 7, 1933 |
| 2,049,673 | Starr | Aug. 4, 1936 |
| 2,117,673 | Lysholm | May 17, 1938 |
| 2,178,356 | Brunner | Oct. 31, 1939 |
| 2,205,794 | Jandasek | June 25, 1940 |
| 2,283,842 | Yingling | May 19, 1942 |
| 2,287,374 | Dodge | June 23, 1942 |
| 2,320,758 | Sinclair | June 1, 1943 |
| 2,333,674 | Powell | Nov. 9, 1943 |
| 2,421,873 | Forsyth | June 10, 1947 |
| 2,448,824 | Price | Sept. 7, 1948 |
| 2,472,181 | Werth | June 7, 1949 |
| 2,503,149 | Bonnemort | Apr. 4, 1950 |
| 2,598,367 | Fiser | May 27, 1952 |
| 2,607,582 | Jurgens | Aug. 19, 1952 |
| 2,624,175 | Raney | Jan. 6, 1953 |